R. M. BATZER.
SPRING TIRE WHEEL.
APPLICATION FILED JUNE 22, 1909.
996,048.
Patented June 27, 1911.
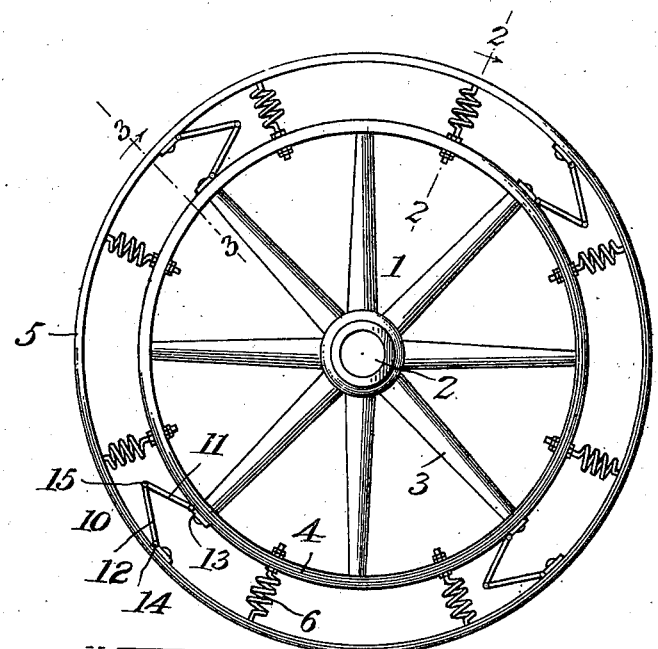
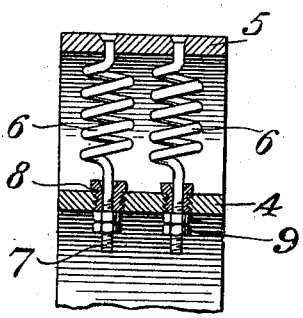
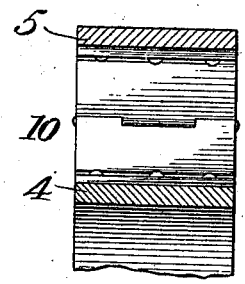
Witnesses
Fenton S. Belt
Wm. Roerth
Inventor
Richard M. Batzer
By Victor J. Evans
Attorney

UNITED STATES PATENT OFFICE.

RICHARD M. BATZER, OF ALBUQUERQUE, TERRITORY OF NEW MEXICO.

SPRING-TIRE WHEEL.

996,048. Specification of Letters Patent. Patented June 27, 1911.

Application filed June 22, 1909. Serial No. 503,674.

*To all whom it may concern:*

Be it known that I, RICHARD M. BATZER, a citizen of the United States, residing at Albuquerque, in the county of Bernalillo and Territory of New Mexico, have invented new and useful Improvements in Spring-Tire Wheels, of which the following is a specification.

This invention relates to wheels, and is primarily directed to resilient wheels, and the principal object of the invention is to provide an ordinary wheel with a supplemental rim, of a greater area than the rim of the wheel, the said rims being sustained in spaced relation through the medium of a plurality of resilient elements and the lateral movement of the outer rim with regard to the inner rim being entirely prevented through the medium of hinged members extending the entire width of both of the members.

With the above and other objects in view the invention resides in the novel construction and arrangement of elements hereinafter fully described and claimed.

In the accompanying drawing, Figure 1 is a side elevation of a wheel constructed in accordance with my invention. Fig. 2 is a sectional view upon the line 2—2 of Fig. 1, and looking in the direction of the arrow. Fig. 3 is a sectional view upon the line 3—3 of Fig. 1.

In the accompanying drawing the numeral 1 designates the wheel proper. This wheel 1 may be constructed in the ordinary manner and comprises a hub 2 provided with radiating spokes 3 and a rim 4. The rim 4 may be constructed of metal or any other desired material and is of a sufficient width to accomplish the purposes for which it is intended.

The numeral 5 designates a hoop of a greater circumference than the rim 4 and securely positioned upon this hoop or outer rim 5 and arranged in pairs are a plurality of resilient elements 6. These springs 6 have their end convolutions provided with extending threaded portions 7. The rim 4 is provided with a plurality of spaced threaded openings arranged in pairs and adapted for the reception of suitable bushings 8. The projecting threaded members 7 of the springs 6 are adapted to be inserted within these bushings and to extend beyond the inner face of the rim 4. The extending portions of the threaded members 7 are adapted for the reception of suitable nuts or retaining elements 9, whereby the spring members 6 retain the hoop or rim 5 in proper spaced relation with the inner rim 4 of the wheel, the nuts being in contact with the bushings, so that when the latter wear by constant working of the springs therein and also the nuts contacting therewith new bushings may be substituted therefor. The said bushings will prevent the wearing of the inner rim at the edges of the openings therein. It is of course to be understood that the rim 5 is constructed from rigid material.

It will be noted that by arranging the spring members 6 in pairs one adjacent the other the liability of the outer rim swinging or moving in a lateral direction away from the inner rim 4 is greatly reduced. In order to effectively prevent the lateral movement of the outer rim or hook 5 upon the inner rim 4, I have provided a hinged member 10. These members 10 are secured to the inner face of the rim 5 and the outer face of the rim 4 between the spaced resilient elements 6. The members 10 each comprise a pair of elements 11 and 12 hingedly connected with the rim 4 as at 13 and to the rim 5 as at 14, while the ends of the said members 11 are hingedly connected together as at 15. The hinged or retaining members 10 are of a width equaling the width of the rims 4 and 5 and it will be noted that by providing the wheel with this structure the rim 5 is effectively supported upon the rim 4 and lateral movement of the said rim 5 is entirely prevented, while at the same time the member 10 does not at all interfere with the action of the springs or resilient members.

It will be obvious that by reason of the threaded engagement of the nuts on the inner ends of the springs 6, the rim 4 may be centered with respect to the outer hoop or rim by merely adjusting the nuts, also the said nuts when adjusted will increase or decrease the tension of the said spring to regulate the yielding quality of the wheel.

Having thus fully described the invention what is claimed as new is:

The combination with a wheel having a rim provided with spaced threaded apertures, of a tread rim concentrically disposed with respect to the said first named rim, coiled retractile springs having straight alining ends, each spring being connected at its outer end to the said tread rim to lie flush with the outer face of the said rim and at its opposite inner end passed through the alining aperture in the wheel rim, bushings detachably threaded in the apertures and surrounding the inner ends of the said springs, the said bushings being held fixed when engaged in the rim, jam nuts adjustably connected with the inner ends of said springs and bearing upon the bushings whereby the wheel may be centered with respect to the tread rim, and means for preventing relative lateral movement of one rim to the other.

In testimony whereof I affix my signature in presence of two witnesses.

RICHARD M. BATZER.

Witnesses:
A. FLEISCHER,
O. C. TAYLOR.

Copies of this patent may be obtained for five cents each, by addressing the "Commissioner of Patents Washington, D. C."